US011203309B2

(12) United States Patent (10) Patent No.: US 11,203,309 B2
Calvillo Cortés et al. (45) Date of Patent: Dec. 21, 2021

(54) TOUCHPAD FOR MIRROR POSTURE ADJUSTMENT

(71) Applicant: Continental Automotive Systems, Inc., Auburn Hills, MI (US)

(72) Inventors: Carlos Francisco Calvillo Cortés, Jalisco (MX); Oscar Gerardo Rodriguez Lango, Jalisco (MX); José Manuel Hernández Vázquez, Jalisco (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 254 days.

(21) Appl. No.: 15/893,359

(22) Filed: Feb. 9, 2018

(65) Prior Publication Data

US 2019/0248306 A1 Aug. 15, 2019

(51) Int. Cl.
*B60R 16/023* (2006.01)
*G06F 3/044* (2006.01)
*B60R 1/062* (2006.01)
*B60R 1/00* (2006.01)

(52) U.S. Cl.
CPC ............ *B60R 16/023* (2013.01); *B60R 1/062* (2013.01); *G06F 3/044* (2013.01); *B60R 1/006* (2013.01)

(58) Field of Classification Search
USPC .......................................................... 701/49
See application file for complete search history.

(56) References Cited

U.S. PATENT DOCUMENTS

| 4,580,875 A * | 4/1986 | Bechtel ................... B60R 1/087 359/604 |
| 5,151,563 A | 9/1992 | Tanaka |
| 6,176,587 B1* | 1/2001 | Fredricks .................. B60R 1/02 307/10.1 |
| 7,084,859 B1* | 8/2006 | Pryor ................. G01C 21/3664 345/156 |
| 9,720,591 B2 | 8/2017 | Di Censo et al. |
| 10,104,525 B1* | 10/2018 | Kaiser .................. H04B 5/0031 |
| 2007/0183068 A1* | 8/2007 | Kozlowski ............... B60R 1/04 359/877 |
| 2011/0196969 A1* | 8/2011 | Tarte ................ H04N 21/41422 709/227 |
| 2011/0304444 A1* | 12/2011 | Zhang .................... B60K 35/00 340/425.5 |
| 2012/0046020 A1* | 2/2012 | Tomasini ............ H04M 1/6075 455/418 |
| 2014/0125097 A1* | 5/2014 | Andreiu .............. B60R 11/0235 297/217.3 |

(Continued)

FOREIGN PATENT DOCUMENTS

| DE | 10352044 A1 | 6/2005 |
| DE | 102012019299 A1 | 8/2013 |
| DE | 102013011414 A1 | 2/2014 |

OTHER PUBLICATIONS

International Search Report and the Written Opinion of the International Searching Authority dated Apr. 1, 2019 for the counterpart PCT Application No. PCT/2019/017261.

*Primary Examiner* — Tyler D Paige

(57) ABSTRACT

A vehicle mirror control system includes a touchpad including a sensing surface operative to produce signals indicative of a desired movement of a vehicle mirror responsive to a gesture detected by the sensing surface. A vehicle mirror assembly and a method are also disclosed.

21 Claims, 5 Drawing Sheets

(56) References Cited

U.S. PATENT DOCUMENTS

| | | | |
|---|---|---|---|
| 2015/0001870 A1* | 1/2015 | Parcher | B60K 35/00 |
| | | | 296/1.07 |
| 2015/0314730 A1 | 11/2015 | An et al. | |
| 2016/0107579 A1* | 4/2016 | Quinn | B60R 1/074 |
| | | | 359/841 |
| 2016/0129851 A1* | 5/2016 | Werner | B60R 13/0243 |
| | | | 701/49 |
| 2016/0227123 A1* | 8/2016 | Nagase | B60R 1/06 |
| 2016/0364111 A1* | 12/2016 | Piekny | G06F 3/0488 |
| 2017/0124987 A1* | 5/2017 | Kim | B60R 11/04 |
| 2018/0251067 A1* | 9/2018 | Elliott | B60R 1/00 |
| 2018/0290594 A1* | 10/2018 | Abdel-Rahman | B60R 1/06 |
| 2019/0248306 A1* | 8/2019 | Calvillo Cortes | B60R 1/062 |

* cited by examiner

TOUCHPAD FOR MIRROR POSTURE ADJUSTMENT

TECHNICAL FIELD

This disclosure relates to a control system for adjusting mirrors of a motor vehicle.

BACKGROUND

Vehicle side mirrors are adjustable to correspond with the physical stature of the vehicle operator. Adjustment of the side mirrors can be by way of a mechanical link between the mirror and a knob within the vehicle. It is also known to include a switch to actuate motors that move the mirror as desired. The switch is provided within the interior of the vehicle interior and is accessible by a vehicle operator. All features within a vehicle interior include aesthetic features that correspond with a layout of the motor vehicle. Automotive manufactures are continually seeking different aesthetic features to differentiate between competing vehicles.

SUMMARY

A vehicle mirror control system according to an exemplary embodiment of this disclosure, among other possible things includes a touchpad including a sensing surface operative to produce signals indicative of a desired movement of a vehicle mirror responsive to a gesture detected by the sensing surface.

In a further embodiment of the foregoing system, the touchpad includes a capacitive touchpad.

In a further embodiment of any of the foregoing systems, the touchpad includes a rectangular surface mountable within a vehicle cabin proximate a vehicle operator.

In a further embodiment of any of the foregoing systems, the touchpad is mountable within a door of the vehicle.

In a further embodiment of any of the foregoing systems, a selector for choosing one of several vehicle mirrors for control and adjustment is included.

In a further embodiment of any of the foregoing systems, the touchpad generates signals indicative of desired direction for the mirror to move responsive sensed movement over the sensing surface.

In a further embodiment of any of the foregoing systems, locations on the sensing surface is defined by an X coordinate and a Y coordinate and the touch pad generates signals to move the mirror toward a position corresponding with the coordinates of the location that the sensing surface senses a touch.

In a further embodiment of any of the foregoing systems, the sensing surface includes a center portion and a speed of movement of the mirror corresponds with one of a distance from the center portion sensed by the sensing surface, a duration of the sensed touch, and a speed of repetition of the sensed touch.

A vehicle mirror assembly according to an exemplary embodiment of this disclosure, among other possible things includes at least one mirror adjustable to a desired position. An actuator moves mirror to the desired position. A touchpad operative to produce signals indicative of the desired position of the vehicle mirror responsive to a gesture detected by a sensing surface. A controller receives signals from the touchpad and generates commands to cause the actuator to move the mirror toward the desired position.

In a further embodiment of the foregoing assembly, the touchpad includes a capacitive touchpad.

In a further embodiment of any of the foregoing assemblies, the touchpad includes a rectangular surface mountable within a vehicle cabin proximate a vehicle operator.

In a further embodiment of any of the foregoing assemblies, the touchpad generates signals indicative of desired direction for the mirror to move responsive sensed movement over the sensing surface.

In a further embodiment of any of the foregoing assemblies, locations on the sensing surface are defined by an X coordinate and a Y coordinate and the touch pad generates signals to move the mirror toward a position corresponding with the coordinates of the location that a touch is sensed by the sensing surface.

In a further embodiment of any of the foregoing assemblies, the sensing surface includes a center portion and a speed of movement of the mirror corresponds with one of a distance of the touch from the center portion sensed by the sensing surface, a duration of the sensed touch, and a speed of repetition of the sensed touch.

In a further embodiment of any of the foregoing assemblies, a selector chooses one of several vehicle mirrors for control and adjustment.

In a further embodiment of any of the foregoing assemblies, the selector corresponds to a predefined X coordinates and a Y coordinates on the touch pad.

A method of assembling an adjustable vehicle mirror according to an exemplary embodiment of this disclosure, among other possible things includes positioning a touchpad including a sensing surface within a vehicle cabin proximate a position of a vehicle operator. A controller is connected to the touchpad to receive signals from the touchpad corresponding with a desired position of a vehicle mirror.

In a further embodiment of the foregoing method, the touchpad is configured to generate a signal indicative of a direction of movement of the vehicle mirror.

In a further embodiment of any of the foregoing methods, the touchpad is configured to include a sensing surface defining an X coordinate and a Y coordinate for each location on the sensing surface that corresponds with a desired position of the vehicle mirror and generating signals to move the mirror toward the position corresponding with the location sensed by the sensing surface.

In a further embodiment of any of the foregoing methods, the sensing surface includes a center portion and generating signals includes determining a speed of movement of the mirror corresponding with one of a distance of the touch from the center portion sensed by the sensing surface, a duration of the sensed touch, and a speed of repetition of the sensed touch.

The various features and advantages of this disclosure will become apparent to those skilled in the art from the following detailed description. The drawings that accompany the detailed description can be briefly described as follows.

DETAILED DESCRIPTION

Figure 1:
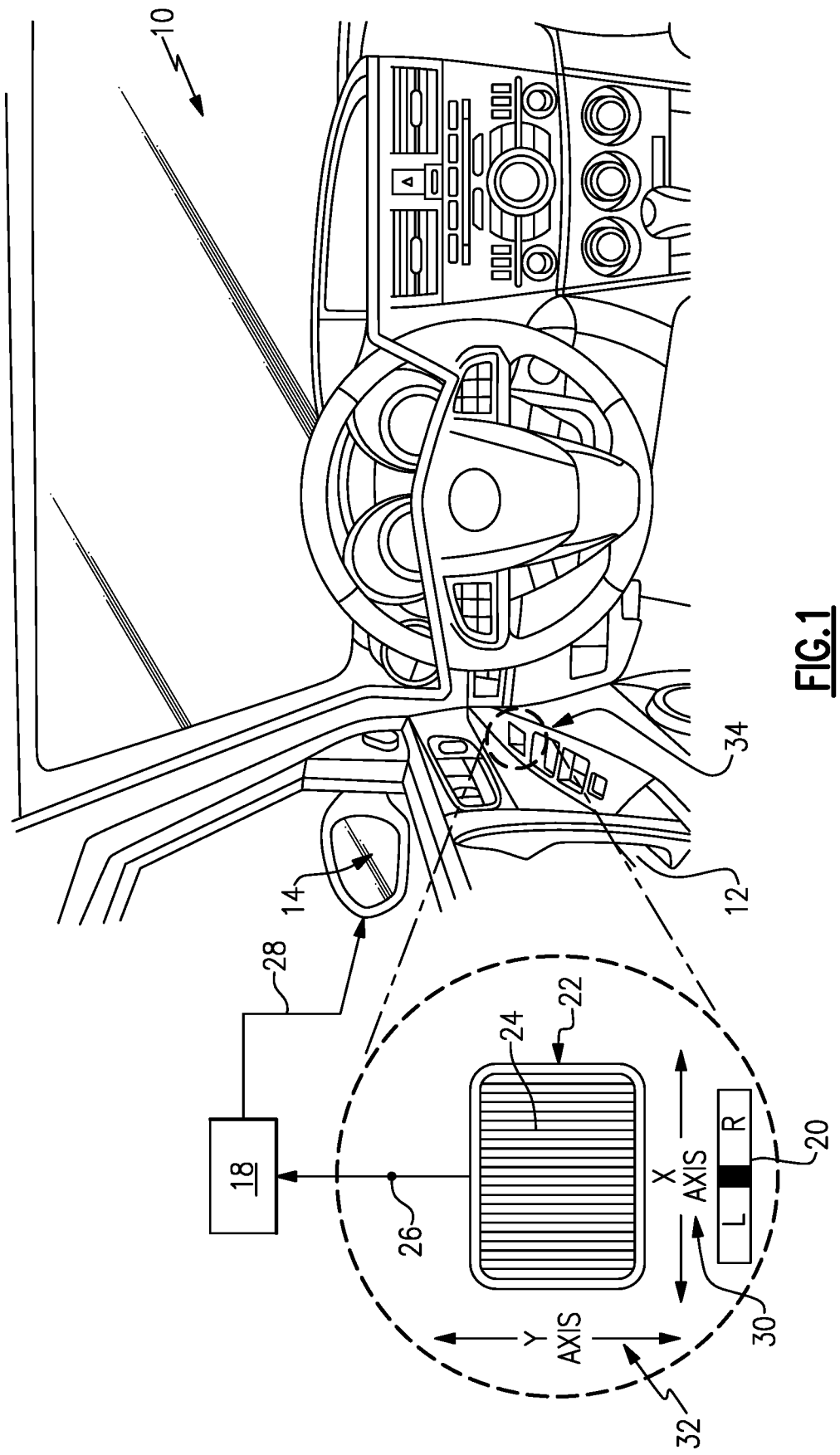
FIG. 1 is a schematic view of an example vehicle including a vehicle mirror control system.

Referring to FIG. 1, a vehicle 10 is schematically illustrated and includes a side mirror 14 that is adjustable through controls provided in a vehicle cabin. In the disclosed embodiment, the vehicle 10 includes a position for a vehicle operator and a door sill 34. Within the door sill 34 is a touchpad 22 that is in communication with a controller 18 to drive an actuator for adjusting a side view mirrors 14. In the illustrated example, only one side view mirror 14 is shown, however, other side view mirrors are also controllable and within the contemplation of this disclosure.

The example touchpad includes a sensing surface 24 that is configured to translate motions from an operator into movement and adjustment of the side mirrors 14. A selector switch is schematically shown at 20 and selected to indicate which of the side mirrors 14 are being adjusted. Alternatively, the selector switch may be incorporated into the touchpad by sensing touch of an operator's finger at a pre-defined area on the touch pad, e.g. a left or right corner corresponding to the side of the vehicle for respective side mirror adjustment.

The touchpad 22 generates signals 26 that are communicated to a controller 18. The controller 18 converts the signals 26 into corresponding commands 28 that are provided to an actuator of the side mirror 14. The actuator then moves the side mirror responsive to the demands generated by the controller 18.

In this example, the touchpad 22 is rectangular shaped and includes a Y-axis 32 and an X-axis 30. The touchpad 22 includes a sensing surface 24 that senses a touch of an operator's finger or other digit within the X and Y coordinates defined on the sensing surface 24. Movement such as swiping or placing of an operator's finger on the sensing surface 24 generates signals 26 that the controller 18 interprets and converts into instructions to an actuator for adjusting the side mirror 14. Further, the touchpad 22 may display prompts for the operator to provide guidance on where to touch the screen to provide the various desired adjustments that are described in further detail below. For example, the touch pad may display an arrow in the vicinity corresponding to the X and Y and pointing in a direction where a touch by the operator in that area would result in a corresponding signal for adjusting the side mirror 14.

In this example, the touchpad 22 is disposed within a sill 34 of a door 12. The touchpad 22 may be located in other areas of the vehicle 10 that are accessible to a vehicle operator.

Figure 2:
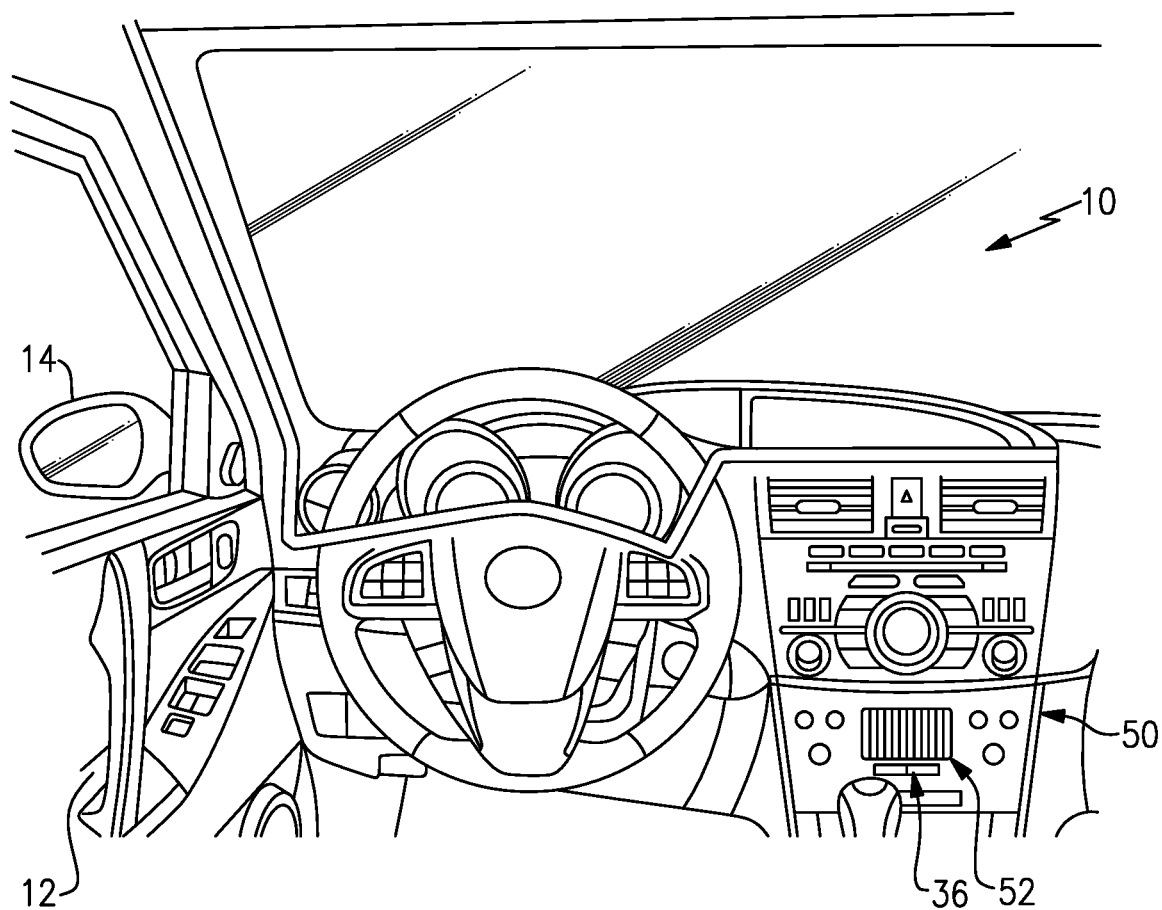
FIG. 2 is a schematic view of another example vehicle mirror control system embodiment.

Referring to FIG. 2, in another disclosed example embodiment, a touchpad 52 is provided as part of a center stack console 50. The touchpad 52 is placed in a location easily accessible to a vehicle operator. The example touchpad 52 is similar to that disclosed in FIG. 1 and generates signals responsive to a touch to command adjustment and movement of the selected vehicle mirror. A selector 32 can be provided to select which of the vehicle mirrors is currently being adjusted by touching of the touchpad 52. In this example the touchpad 52 is separate from other touch control system, however it is within the contemplation of this disclosure that the touchpad 52 could be part of a multipurpose touch screen that controls other vehicle systems in addition to the position of the vehicle mirrors.

Alternatively, whether or not the touchpad 52 is part of a multipurpose touch screen the selector 32 may be incorporated into the touchpad by sensing touch of an operator's finger at a pre-defined location on the touch pad, e.g. a left or right corner corresponding to the side of the vehicle for respective side mirror adjustment. Further, the touchpad 52 may display prompts for the operator to provide guidance on where to touch the screen to provide the various desired adjustments that are described in further detail below. For example, the touch pad may display an arrow in the vicinity corresponding to the X and Y and pointing in a direction where a touch by the operator in that area would result in a corresponding signal for adjusting the side mirror 14.

Figure 3:
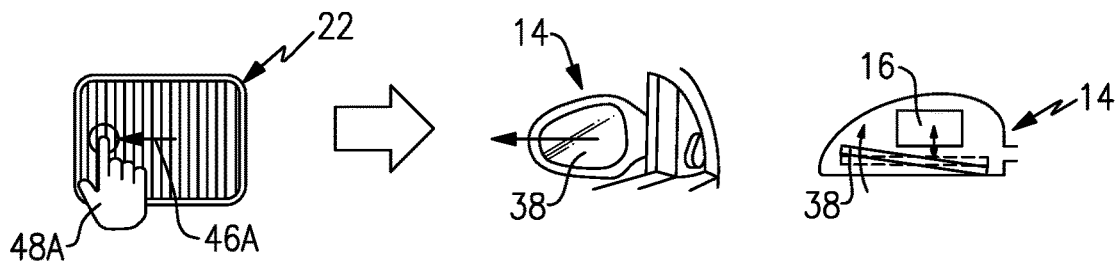
FIG. 3 is a schematic representation of a motion to adjust a vehicle mirror.

Referring to FIG. 3 with continued reference to FIGS. 1 and 2, an example motion on the touchpad 22 is illustrated. In the schematic illustration a touch indicated at 48A is provided in a swiping manner in a direction indicated at 46A. The vehicle side view mirror 14 includes a mirror 38 that is moved by an actuator 16. The actuator 16 can be of any configuration required to facilitate movement of the mirror as desired to provide a view along a side of the vehicle. The swiping motion is translated into movement of the vehicle mirror by the actuator 16. In this example, movement is along the X-axis and translates into tilting of the vehicle mirror 38 horizontally to the left.

Figure 4:
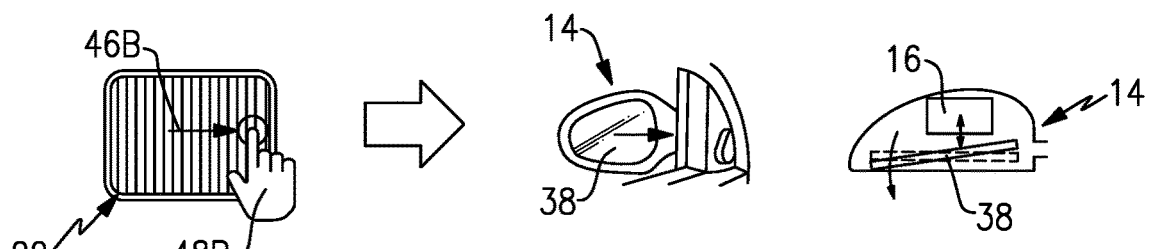
FIG. 4 is another schematic representation of an example motion to adjust a vehicle mirror.

Referring to FIG. 4 with continued reference to FIG. 1, another swipe motion is schematically indicated and shown at 46B where the touch 48B is swiping to the right as indicated by the arrow. The swiping to the right indicated in FIG. 3 is translated by the controller 18 into angled movement of the mirror 38 such that the mirror 38 provides a more outward view of objects around the vehicle.

Figure 5:
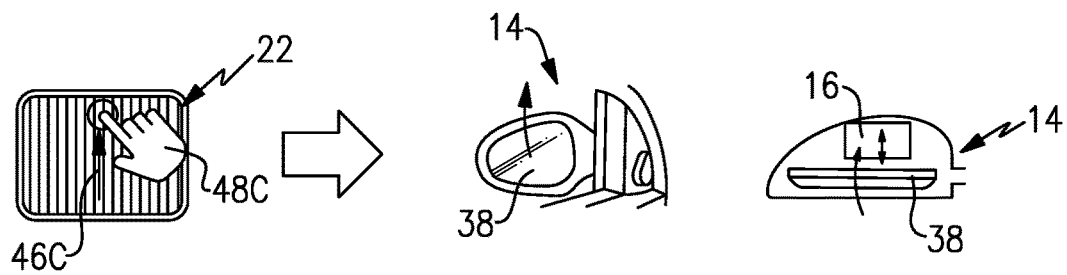
FIG. 5 is yet another example schematic illustration of an example motion to adjust a vehicle mirror.

Referring to FIG. 5, another swiping motion is schematically indicated at 46C and includes a swiping upward motion and touch 48C. The swiping upward motion provides for the mirror 38 to be angled such that the view of objects behind the vehicle 10 will be elevated.

Figure 6:
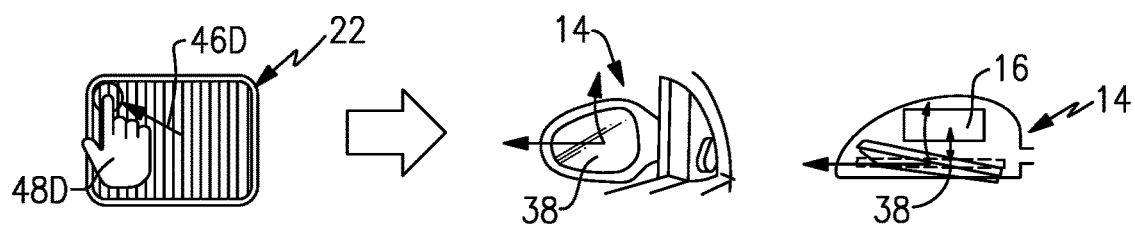
FIG. 6 is yet another example of a motion for adjusting a vehicle mirror.

Referring to FIG. 6 with continued reference to FIG. 1, another swiping motion 46D and touch 48D is schematically illustrated and includes an angled motion towards an upper left corner of the touchpad 22. This motion will provide a compound movement of the mirror 38 such that the mirror 38 will move to provide a view angled upward and inward towards the vehicle.

The example touchpad 22 can be a capacitive sensing device or other touch sensitive devices as are known. Although the example touchpad 22 includes a sensing surface 24 that is the capacitive touch device that is responsive to and senses a location of an operator's finger upon touching, other devices that convert a touch on a physical surface to a location and movement of the mirror would also be within the contemplation of this disclosure.

Figure 7:
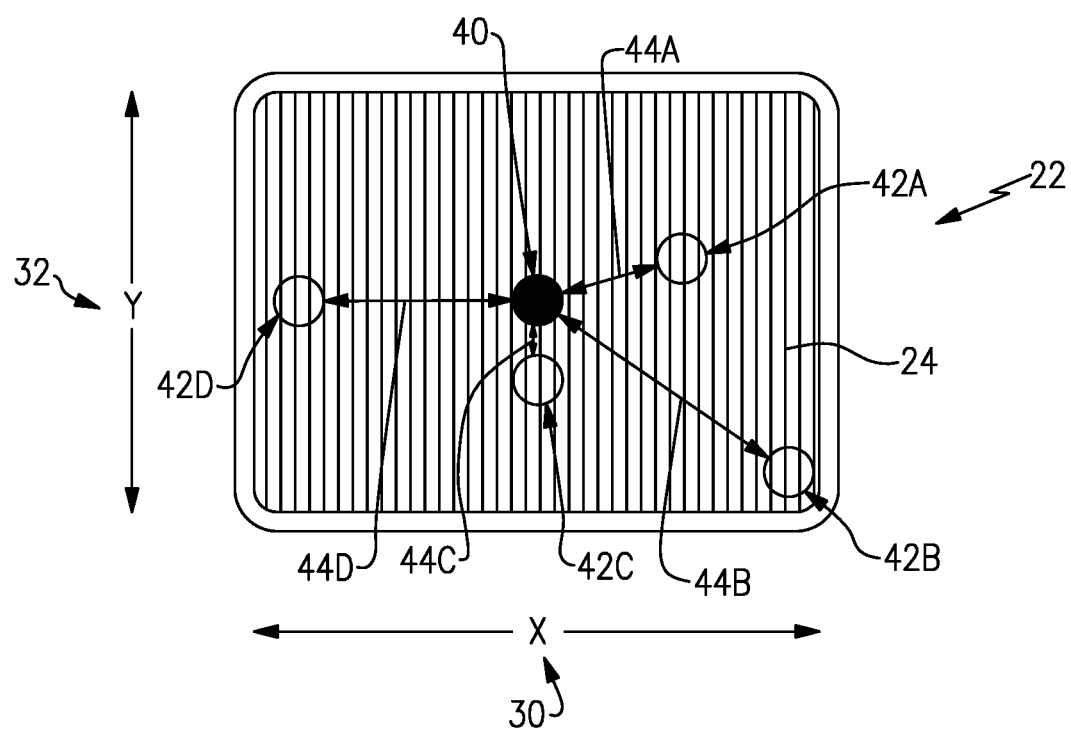
FIG. 7 is a schematic representation of a sensing surface of an example touchpad.

Referring to FIG. 7 with continued reference to FIG. 1, another example touchpad 22 is schematically illustrated. The touchpad 22 is rectangular in shape and includes X axis 32 and Y axis 30. In this example, movement of the mirror 38 is communicated by touching the sensing surface 24 relative to a central portion 40. The central portion 40 is indicative of a default position of the side view mirror 14. Touching the sensing surface 24 in a location spaced apart from the central portion 40 automatically generates commands without swiping for moving the mirror 38 towards touch location.

In this example, a touch location indicated at 42a is spaced a distance 44a from the central portion 40. The distance 44a from the central portion 40 is indicative of a speed that the mirror will move to the desired location that corresponds with the position 42a. The shorter the distance 44a, the slower the mirror will move. The longer the distance between the touch position and the central portion 40 the faster the mirror will move.

In another example, a touch location 42b is spaced a distance 44b which is at an extreme edge of the sensing 24 and thereby indicates that the operator wishes the mirror to move quickly in the desired adjustment direction.

Another touch location 42c is indicated and a relatively small distance 44c from the central portion 40 and thereby indicates that very slow or fine adjustments are desired of the side mirror 14. Another location 42d is spaced a distance 44d from the central portion 40. The distance 44d provides an indication to the controller 18 of the speed at which the operator wishes the mirror 38 to move to a position corresponding with the touch position 42d. In this example, the location 42d provides for tilting of the mirror inward such that rear view will be more towards the vehicle.

Each of the touch locations 42a-d are dynamic in that as the operator moves the location of the touch on the sensing surface 24 so will the controller 18 change the commands 28 to the actuator 16 and provide a corresponding response for movement of the vehicle mirror 14.

Figure 8:
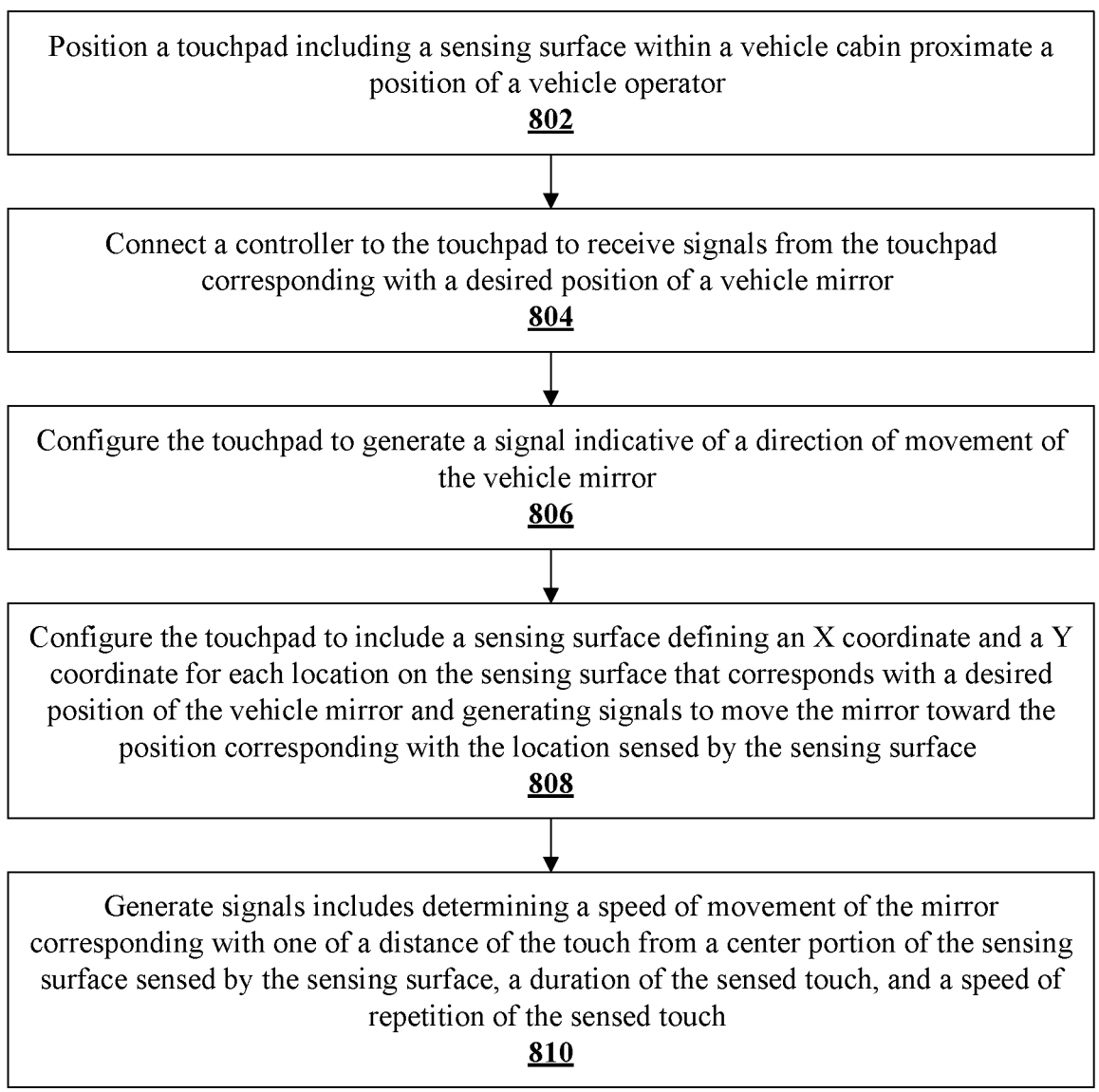
FIG. 8 is a schematic representation of a method of assembling an example adjustable vehicle mirror.

Alternatively, touching the sensing surface 24 in a location spaced apart from the central portion 40 automatically generates commands for moving the mirror 38 towards the corresponding touch location 42A-C. In this embodiment, adjustment speed may be independent of the distance 44A-D from the central portion 40. The operator may, therefore, control speed of adjustment by varying either the length of the touch or the frequency of repetition of the touch. That is, a short duration of touch or a slow repetition of touch indicates that the operator wishes the mirror to move slowly in the desired adjustment direction and a long duration of touch or a quick repetition of touch indicates that the operator wishes the mirror to move quickly in the desired adjustment direction FIG. 8 illustrates a schematic representation of a method of assembling an example adjustable vehicle mirror, at 800. The method may also include, positioning a touchpad including a sensing surface within a vehicle cabin proximate a position of a vehicle operator, at 802. In some embodiment the method may also including, connecting a controller to the touchpad to receive signals from the touchpad corresponding with a desired position of a vehicle mirror, at 804. In some embodiment the method may also including, configuring the touchpad to generate a signal indicative of a direction of movement of the vehicle mirror, at 806. In some embodiment the method may also including, configuring the touchpad to include a sensing surface defining an X coordinate and a Y coordinate for each location on the sensing surface that corresponds with a desired position of the vehicle mirror and generating signals to move the mirror toward the position corresponding with the location sensed by the sensing surface, at 808. In some embodiment the method may also including, generate signals includes determining a speed of movement of the mirror corresponding with one of a distance of the touch from a center portion of the sensing surface sensed by the sensing surface, a duration of the sensed touch, and a speed of repetition of the sensed touch, at 810.

It should be understood that the controller 18 may be processor including hardware for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions. The controller 18 may be part of the overall vehicle controller or separate controller used for the disclosed vehicle mirror adjustment system.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

The example vehicle mirror adjusting system provides a simple, intuitive adjusting process for an operator without that provides desired aesthetic appearance within the vehicle and limits the number of moving parts and operable switches.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle mirror control system comprising:
a touchpad including a sensing surface operative to produce signals indicative of a desired movement of a vehicle mirror responsive to a gesture detected by the sensing surface; and
wherein locations on the sensing surface is defined by an X coordinate and a Y coordinate and the touch pad generates signals to move the mirror toward a position corresponding with the coordinates of the location that the sensing surface senses a touch and the sensing surface includes a center portion and a speed of movement of the mirror corresponds with a distance from the center portion sensed by the sensing surface.

2. The vehicle mirror control system as recited in claim 1, wherein the touchpad comprises a capacitive touchpad.

3. The vehicle mirror control system as recited in claim 2, wherein the touchpad comprises a rectangular surface mountable within a vehicle cabin proximate a vehicle operator.

4. The vehicle mirror control system as recited in claim 3, wherein the touchpad is mountable within a door of the vehicle.

5. The vehicle mirror control system as recited in claim 3, wherein the touchpad is mountable within a center stack console of the vehicle.

6. The vehicle mirror control system as recited in claim 1, including a selector for choosing one of several vehicle mirrors for control and adjustment.

7. The vehicle mirror control system as recited in claim 1, wherein the touchpad generates signals indicative of desired direction for the mirror to move responsive sensed movement over the sensing surface.

8. The vehicle mirror control system as recited in claim 1, wherein the speed of movement of the mirror further corresponds with a duration of the sensed touch or a speed of repetition of the sensed touch.

9. The vehicle mirror control system as recited in claim 1, wherein the position corresponding with the coordinates of the location that sensing surface senses the touch is fixed on the touchpad.

10. A vehicle mirror assembly comprising:
   at least one mirror adjustable to a desired position;
   an actuator for moving mirror to the desired position;
   a touchpad operative to produce signals indicative of the desired position of the vehicle mirror responsive to a gesture detected by a sensing surface;
   a controller receiving signals from the touchpad and generating commands to cause the actuator to move the mirror toward the desired position; and
   wherein locations on the sensing surface is defined by an X coordinate and a Y coordinate and the touch pad generates signals to move the mirror toward a position corresponding with the coordinates of the location that a touch is sensed by the sensing surface.

11. The vehicle mirror assembly as recited in claim 10, wherein the touchpad comprises a capacitive touchpad.

12. The vehicle mirror assembly as recited in claim 10, wherein the touchpad comprises a rectangular surface mountable within a vehicle cabin proximate a vehicle operator.

13. The vehicle mirror assembly as recited in claim 10, wherein the touchpad generates signals indicative of desired direction for the mirror to move responsive sensed movement over the sensing surface.

14. The vehicle mirror assembly as recited in claim 10, wherein the sensing surface includes a center portion and a speed of movement of the mirror corresponds with one of: a distance of the touch from the center portion sensed by the sensing surface, a duration of the sensed touch, and a speed of repetition of the sensed touch.

15. The vehicle mirror assembly as recited in claim 10, including a selector for choosing one of several vehicle mirrors for control and adjustment.

16. The vehicle mirror assembly as recited in claim 10, wherein the selector corresponds to a predefined X coordinates and a Y coordinates on the touch pad.

17. The vehicle mirror assembly as recited in claim 10, wherein the position corresponding with the coordinates of the location that sensing surface senses the touch is fixed on the touchpad.

18. A method of assembling an adjustable vehicle mirror comprising:
   positioning a touchpad including a sensing surface within a vehicle cabin proximate a position of a vehicle operator;
   connecting a controller to the touchpad to receive signals from the touchpad corresponding with a desired position of a vehicle mirror; and
   configuring the touchpad to include a sensing surface defining an X coordinate and a Y coordinate for each location on the sensing surface that corresponds with a desired position of the vehicle mirror and generating signals to move the mirror toward the position corresponding with the location sensed by the sensing surface.

19. The method of assembling an adjustable vehicle mirror as recited in claim 18, including configuring the touchpad to generate a signal indicative of a direction of movement of the vehicle mirror.

20. The method of assembling an adjustable vehicle mirror as recited in claim 18, wherein the sensing surface includes a center portion and generating signals includes determining a speed of movement of the mirror corresponding with one of: a distance of the touch from the center portion sensed by the sensing surface, a duration of the sensed touch, and a speed of repetition of the sensed touch.

21. The method of assembling an adjustable mirror as recited in claim 18, wherein the position corresponding with the coordinates of the location that sensing surface senses the touch is fixed on the touchpad.

* * * * *